United States Patent [19]

Gonzalez

[11] Patent Number: 4,948,077
[45] Date of Patent: Aug. 14, 1990

[54] LAUNDRY BUGGY

[76] Inventor: Anthony J. Gonzalez, 1735 N. Pulaski, Chicago, Ill. 60639

[21] Appl. No.: 306,496

[22] Filed: Feb. 6, 1989

[51] Int. Cl.$^5$ ............................................. A47K 1/04
[52] U.S. Cl. ............................ 248/129; 280/DIG. 3; 280/288.4
[58] Field of Search ................. 248/129, 164, 98, 461, 248/150; 280/DIG. 3, 289 A, 299, 302; 108/118, 119

[56] References Cited

U.S. PATENT DOCUMENTS

| | | | |
|---|---|---|---|
| D. 142,171 | 8/1945 | Lion | 3/14 |
| 1,016,848 | 2/1912 | North | 38/106 |
| 1,173,746 | 2/1916 | Sargent . | |
| 1,769,418 | 7/1930 | Cooper | 280/DIG. 3 X |
| 1,917,903 | 7/1933 | Sargent . | |
| 2,175,288 | 10/1939 | Florang | 248/129 |
| 2,478,678 | 8/1949 | Agnew et al. | 217/122 |
| 2,557,594 | 6/1951 | Bryan | 311/83 |
| 2,724,430 | 11/1955 | Garner | 248/439 X |
| 2,957,736 | 10/1960 | Olander | 248/164 |
| 3,026,160 | 3/1962 | Bisp | 311/84 |
| 3,168,271 | 2/1965 | Deschenes | 248/129 |
| 3,176,320 | 4/1965 | Miret | 5/3 |
| 3,435,957 | 4/1969 | Lloyd | 38/106 X |
| 3,669,227 | 6/1972 | Alford | 248/461 X |
| 3,806,146 | 4/1974 | Shaw | 280/DIG. 3 X |
| 3,934,895 | 1/1976 | Fox | 280/DIG. 3 X |
| 4,022,414 | 5/1977 | Egger | 248/150 |
| 4,467,989 | 8/1984 | Stroh | 248/97 |

FOREIGN PATENT DOCUMENTS 792897 4/1958 United Kingdom ......... 280/DIG. 3

Primary Examiner—J. Franklin Foss
Attorney, Agent, or Firm—Thomas R. Vigil

[57] ABSTRACT

The laundry buggy is collapsible to a small space, such as that of a large attache case, and which is erectable into a basket assembly with a supporting leg structure. The laundry buggy includes a basket assembly and a leg assembly. The basket assembly comprises a bottom wall, a first end wall pivotally connected to an upper side of the bottom wall adjacent one end thereof, a second end wall pivotally connected to an upper side of the bottom wall adjacent the other end thereof, the end walls being pivotable towards each other and downwardly over the bottom wall to form a collapsed basket assembly and each having side edge, a piece of flexible material being fixed to and between each pair of opposed side edges of the end walls, and forming flexible side walls of the basket assembly and being collapsible to a position underneath the end walls when they are collapsed downwards. The leg assembly comprises first and second U-shaped leg formations each including a first leg that is pivotably connected to a second leg of the other formation and an upper bight-forming bar, first and second U-in-cross-section snap-type clamps fixed respectively to the underside of the bottom wall of the basket assembly adjacent each end thereof for snap-fittingly receiving the bight-forming bar of one of the leg formations for fixing the leg assembly in an upright erect position to the underside of basket assembly.

14 Claims, 3 Drawing Sheets

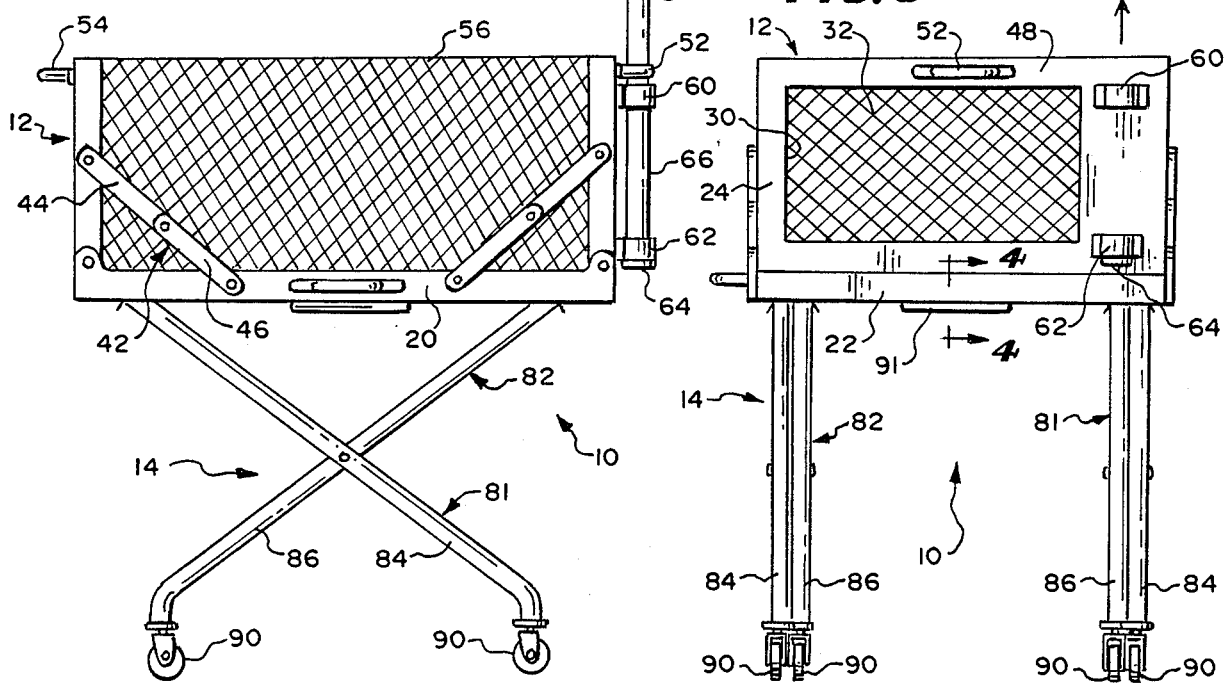

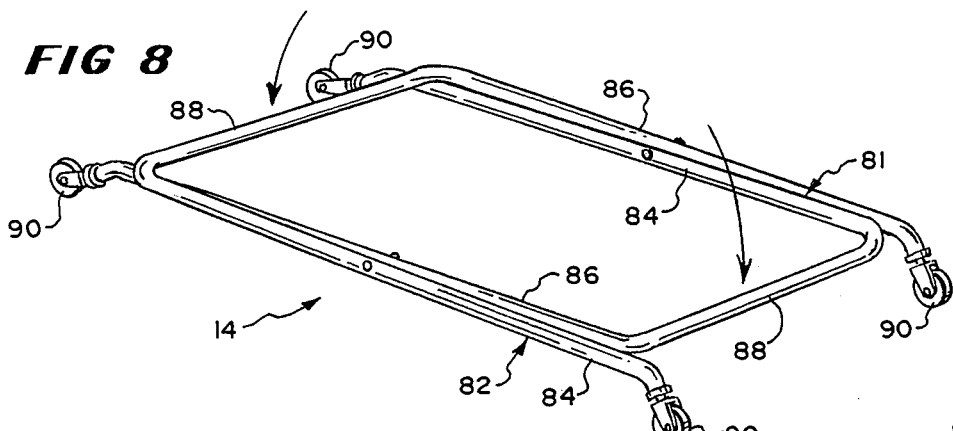
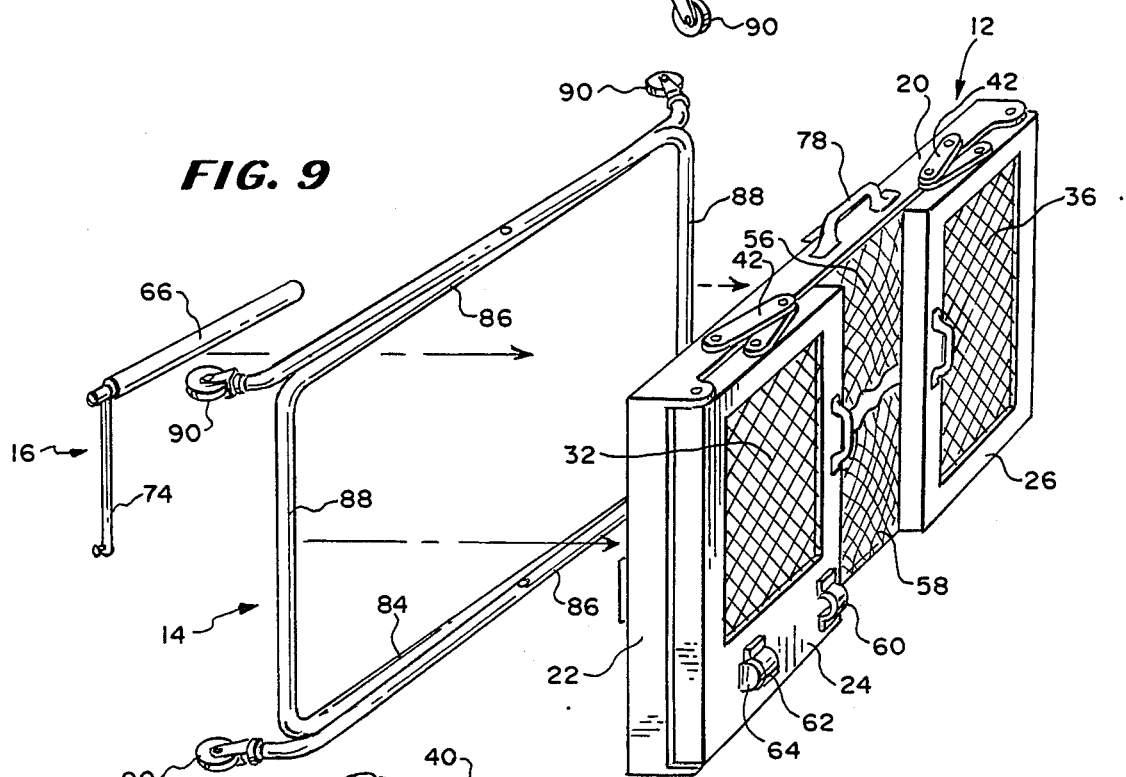
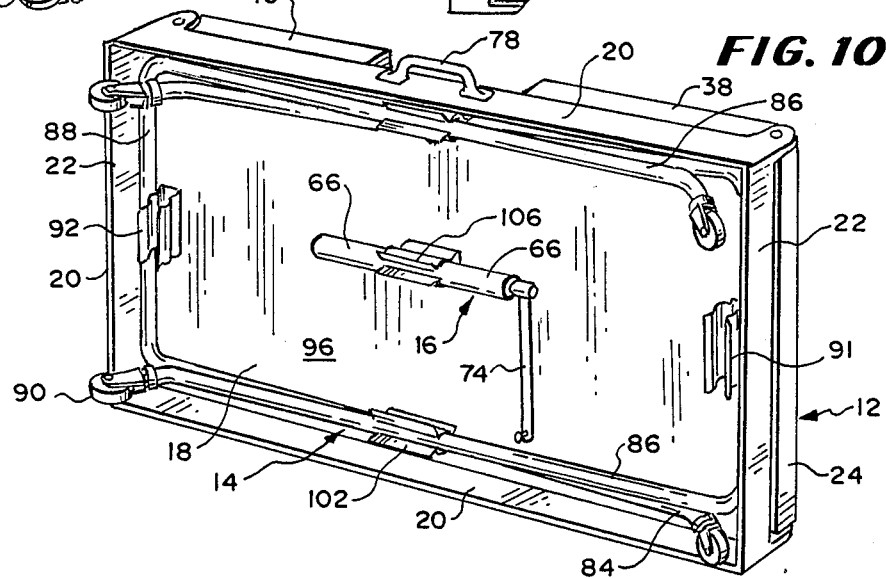

LAUNDRY BUGGY

THE BACKGROUND OF THE INVENTION

1. Field of the Invention

The present invention relates to a laundry buggy and in particular, to a laundry buggy which includes a collapsible laundry basket and a collapsible leg assembly which can be collapsed and carried together in a compact connected arrangement and which, as desired, can be erected to form a laundry buggy including an erect laundry basket supported on an erected leg assembly.

2. Description of the Prior Art

Heretofore a laundry basket assembly with collapsible legs has been proposed in the Sargent U.S. Pat. No. 1,173,746 and U.S. Pat. No. 1,917,903.

Furthermore, a portable laundry basket with a foldable support therefor is disclosed in the Agnew et al. U.S. Pat. No. 2,478,678.

More recently, a laundry basket with portable legs is proposed in the Egger U.S. Pat. No. 4,022,414.

As will be described in greater detail hereinafter, the laundry buggy of the present invention differs from these previously proposed laundry baskets by providing a laundry buggy which has a selectively collapsible leg assembly and a selectively collapsible basket assembly which both can be collapsed and releasably fixed together to provide a compact structure for carrying and which assemblies can be erected at will to provide a stand-up laundry basket. Additionally, a clothes hanging assembly can be provided which is detachably fixable to the erected laundry basket for hanging clothes an which can be collapsed and releasably fixed to the collapsed laundry basket for being carried therewith.

Still further, the leg assembly, and, when utilized, the clothes hanging assembly, can be fixed to the underside of the collapsed basket assembly so that the collapsed components of the laundry buggy can be detachably connected together and carried in a compact fixed together manner.

SUMMARY OF THE INVENTION

According to the invention there is provided a laundry buggy which is collapsible to take up a small volume, such as the volume occupied by a large attache case, and which is erectable into a laundry buggy. The laundry buggy comprises a basket assembly including a bottom wall, with a top side and a bottom side, two end walls each pivotally mounted to a respective end of the bottom wall and foldable over the bottom wall, and flexible side walls fixed between the end walls and foldable inwardly over the bottom wall top side upon folding of the end walls over the bottom wall top side. A leg assembly is releasably fixed to the bottom side of the bottom wall and includes four legs which are foldable parallel to the side wall to a generally flat position assembly. Means are provided for releasably fixing the leg assembly in an erect position to the bottom side of the bottom wall of the basket assembly. The leg assembly is detachable from the basket assembly for being collapsed to the generally flat position assembly and means are provided for releasably fixing the collapsed leg assembly to and adjacent the bottom side of the bottom wall.

BRIEF DESCRIPTION OF THE DRAWINGS

FIG. 1 is a perspective view of a laundry buggy constructed according to the teachings of the present invention.

FIG. 2 is a side elevational view of the erected laundry buggy shown in FIG. 1. and shows a clothes hanging assembly of the laundry buggy in a retracted lower positon.

FIG. 3 is an end elevational view of the laundry buggy shown in FIG. 1 and shows the telescoped clothes hanging assembly moved upwardly out of its mounted position at one end of the laundry buggy.

FIG. 4 is a fragmentary sectional view of the connection of one upper bar of one leg formation of the leg assembly of the laundry buggy of the present invention and is taken along line 4—4 of FIG. 3.

FIG. 8 is a perspective view of the closed leg assembly of the laundry buggy of the present invention.

FIG. 9 is an exploded perspective view of the collapsed laundry buggy positioned on its side and shows the collapsed laundry basket, the collapsed leg assembly and the collapsed clothes hanging assembly about to be releasably fixed together.

FIG 10 is a bottom perspective view of the collapsed laundry buggy showing the leg assembly and the clothes hanging assembly releasably fixed to the bottom underside of the laundry basket assembly.

DESCRIPTION OF THE PREFERRED EMBODIMENT

Figure 5:
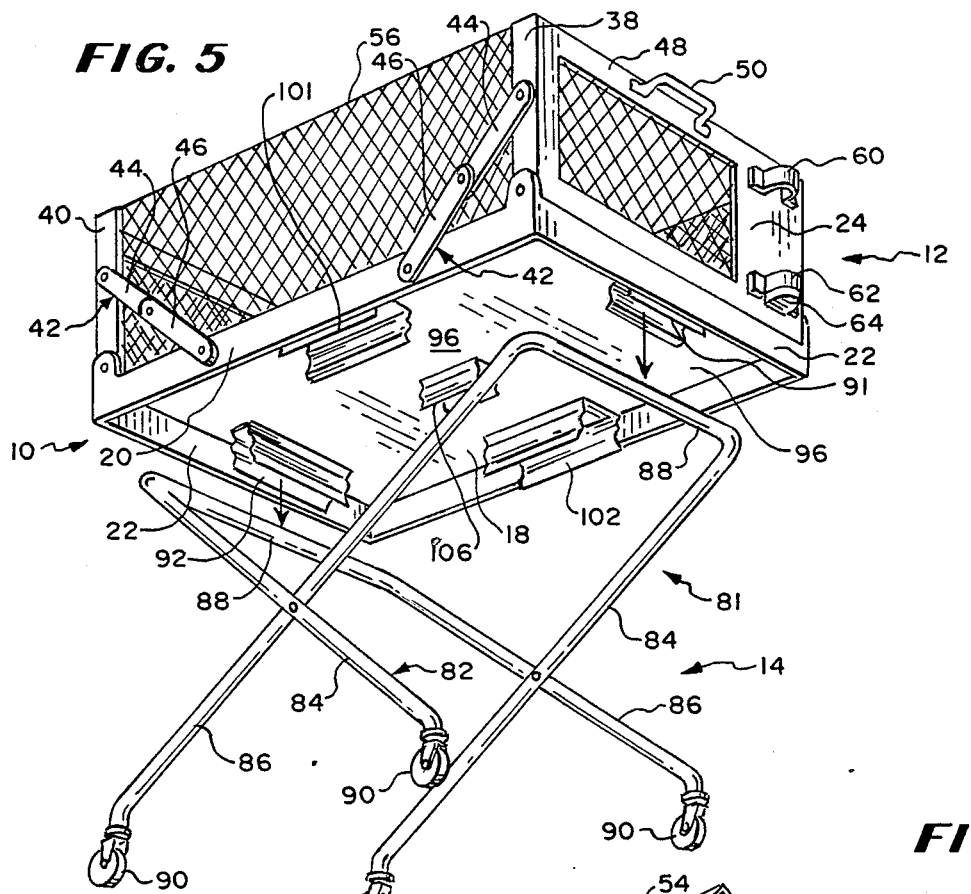
FIG. 5 is a partially exploded perspective view of the laundry buggy shown in FIG. 1 viewing same from the bottom side thereof, with the leg assembly removed from the basket assembly.

Referring now to the drawings in greater detail, FIG. 1 is a perspective view of the laundry buggy 10 of the present invention which includes a basket assembly 12, a leg assembly 14, and, if desired a clothes hanging assembly 16.

The basket assembly 12 includes a rectangular bottom wall 18 having opposed depending side edges 20 and opposed depending end edges 22. First and second end walls 24 and 26 are pivotally connected to the upper side 28 of the bottom wall 18 adjacent each end edge 22 thereof.

The first end wall 24 has a window 30 therein in which is fixed a mesh or netting 32 made of cloth or plastic material.

In like manner the other end wall 26 has a window 34 therein in which a similar mesh or netting 36 is mounted. Each end wall 24, 26 has two side edges 38, 40 to which is pivotally connected a linkage assembly 42 comprising two links 44, 46 pivotally connected together. One link 44 is pivotally connected at its other end to an end wall side edge 38 and 40 and the other link 46 is pivotally connected at its other end to a bottom wall side edge 20.

Each end wall 24, 26, in a panel area 48, 50 thereof above the window 30, 34 therein, has a handle 52, 54 mounted thereto.

The linkage assemblies 42 assist and facilitate holding each end wall 24, 26 in an upright position shown in FIG. 1 and are collapsible when pivoted about the pivot between the links 44, 46 of each linkage assembly 42 to allow each end wall 24, 26 to collapse inwardly over the bottom wall 18.

Fixed between opposed side edges 38, 40 of the opposed end walls 24, 26 is a first side mesh wall 56 and a second side mesh wall 58 which, when the basket assembly 12 is erected as shown in FIG. 1, define side walls 56, 58 for the basket assembly 12.

Figure 6:
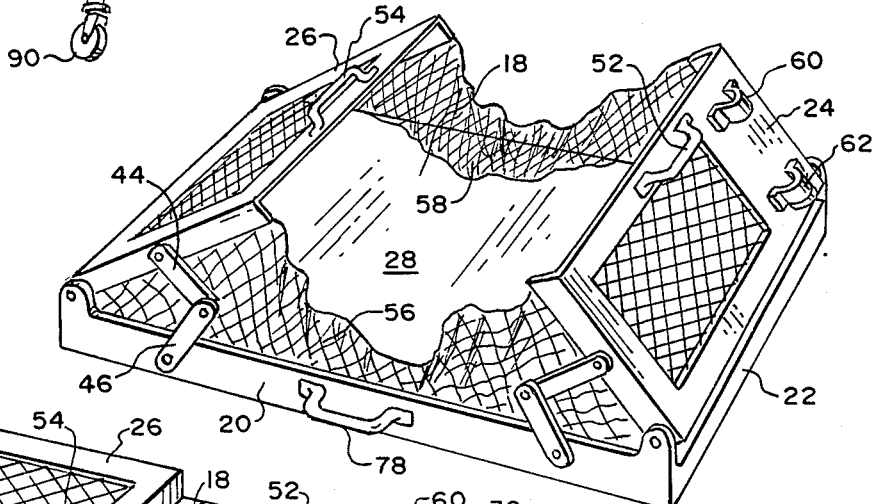
FIG. 6 is a perspective view of the basket assembly partially closed.
Figure 7:
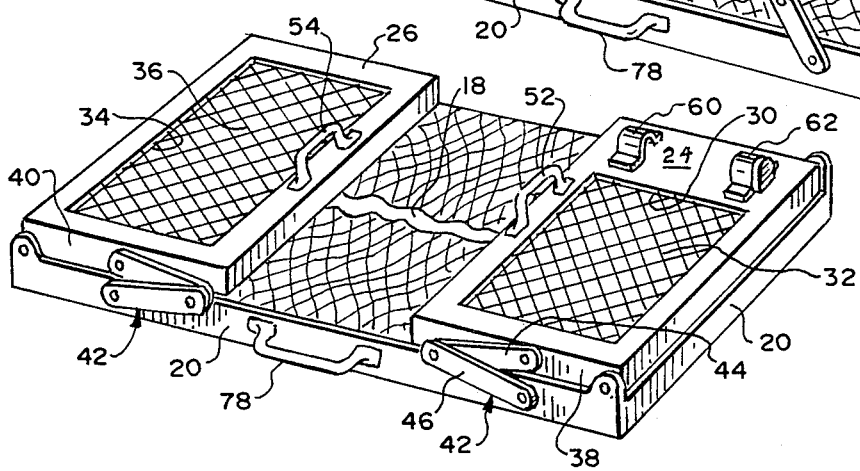
FIG. 7 is a perspective view of the closed basket assembly.

As shown in FIGS. 6 and 7, each end wall 24, 26 can be pivoted inwardly and downwardly over the bottom wall 18 with the mesh side walls 56, 58 collapsed therebetween and over the mesh side walls 56, 58 and with the linkage assemblies 42 articulated to facilitate such pivotably downward movement of the end walls 24, 26 to a collapsed state of the basket assembly 12 as showm in FIG. 7.

As shown in FIG. 1 the end wall 24 has upper and lower U-shaped clamps 60, 62 fixed thereto with the bottom clamp 62 being closed at an end 64 thereof facing downwardly so as to form a stop for a tubular member 66 of the clothes hanging assembly 16 which is releaseably received within the two vertically spaced clamps 60, 62 whereby laundry can be hung from an upper arm 70 of the clothes hanging assembly 16.

As shown in FIGS. 1, 2 and 3 the clothes hanging assembly 16 includes the tubular member 66 and an upper rod 72 which is telescopicly received in the lower tubular member 66. The arm 70 is fixed to and extends outwardly from an upper end 74 of the rod 72. Preferably, the arm 70 has at its outer end a boss, pin, or detent 76 to prevent hangers (not shown) from sliding off of the outer free end of the arm 70.

The bottom wall 18 and the two end walls 24, 26 can be made of metal, wood, plastic or other suitable material. The mesh material in the windows 30, 34 and the mesh material forming the two collapsible side walls 56, 58 can be made from a cloth or plastic material.

To facilitate carrying of the collapsed basket assembly 12 with the leg assembly 14 fixed thereto or separately, at least one handle 78 is provided along one side edge 20 of the bottom wall 18. If desired, a second handle 78 can be provided on the other side edge 20, although only one handle 78 is preferred so that the collapsed basket assembly 12 can be supported on one side edge 20.

Referring now to FIG. 5, it will be apparent that the leg assembly 14 includes two U-shaped leg formations 81, 82 each defined by a first leg 84, a second leg 86, and an upper bight defining bar 88. In this way, four legs 84, 86, 84, 86 are provided. As shown, leg 84 of the leg formation 81 is pivotally connected to the leg 86 of the other leg formation 82. Likewise, the opposed legs 86 and 84 of the leg formations 81, 82 are pivotally connected to each other as shown. Attached at the bottom of each leg 84, 86 is a wheel assembly 90 as shown in FIG. 5.

In its collapsed form and as shown in FIG. 8, the legs 84 and 86 of the leg formation 81 and the legs 86 and 84 of leg formation 82 lie adjacent to each other with the upper bars 88 of each leg formation 81 and 82 spaced apart as shown. Then when it is desired to assemble the leg assembly 14 to the basket assembly 12, the leg formations are folded to the position shown in FIG. 5 and the upper bar 88 of each leg formation 81, 82 is received within one of two elongate U-in-cross-section clamps 91, 92 each of which is fixed to the underside 96 of the bottom wall 18 adjacent one end thereof.

When it is desired to collapse the laundry buggy 10 to a compact assembly for carrying, the end walls 24, 26 of the basket assembly 12 are folded down as shown in FIG. 6 to the position shown in FIG. 7. Then the bars 88 of each formation 81, 82 leg are snapped out of their engagement with the clamps 91 and 92 and each leg formation 81, 82 is folded to the position shown in FIG. 8.

Next the leg assembly 14 is placed on its side and moved into engagement with a pair of side clamps 101 and 102,(similar to the end clamps 91 and 92) which are affixed to the underside 96 of the bottom wall 18 end located adjacent to but inwardly of the side edges 20 of the bottom wall 18. One of the legs 84, 86 of one leg formation 81 is snap fittingly received in one of the clamps 101 and one of the legs 86, 84 of the other leg formation 82 is snap fittingly received in the other clamp 102 for releasably fixing the leg assembly 14 in a collapsed condition to the underside 96 of the bottom wall 18.

In a similar manner another elongated U-in-cross-section clamp 106 is fixed to the underside 96 of the bottom wall 18 in the middle area thereof and is adapted to receive the tubular member 66 of the clothes hanging assembly 16 when it is in a collapsed condition as shown in FIG. 10.

From the foregoing description it will be apparent that the laundry buggy 10 of the present invention, including the components thereof, comprising a basket assembly 12, a leg assembly 14, and, if desired, a clothes hanging assembly 16, all of which can be fixed to each other to form a laundry buggy as shown in FIG. 1 or which can be collapsed and fixed to each other to provide a compact, easily carried, collapsed laundry buggy 10, as shown in FIG. 10, have a number of advantages, some of which have been described above and others of which are inherent in the invention.

Also, it will be apparent that modifications can be made to the laundry buggy 10 of the present invention without departing from the teachings of the present invention. Accordingly, the scope of the invention is only to be limited as necessitated by the accompanying claims.

I claim:

1. A laundry buggy which is collapsible to a small space, such as that of a large attache case, and which is erectable into a basket assembly with a supporting leg structure, said laundry buggy including a basket assembly and a detachable leg assembly, said basket assembly comprising a bottom wall, a first end wall pivotally connected to an upper side of the bottom wall adjacent one end thereof, a second end wall pivotally connected to an upper side of said bottom wall adjacent the other end thereof, said end walls being pivotable toward each other and downwardly over said bottom wall to form a collapsed basket assembly and each having side edge, a piece of flexible material being fixed to and between each paifd of opposed side edges of said end walls, and forming flexible side wall of said basket assembly and being collapsible to a position underneath said end walls when they are collapsed downwards, said detachable leg assembly comprising first and second U-shaped leg formations each including a first leg that is pivotably connected to a second leg of the other leg formation and an upper bight-forming bar, first and second U-in-cross-section snap-type clamps fixed respectively to the underside of said bottom wall of said basket assembly adjacent each end thereof for snap-fittingly receiving the bight-forming bar of one of said leg formations for fixing said leg assembly in an upright erect position to the underside of said basket assembly, and first and second U-in-cross-section clamps mounted to the underside of said bottom wall adjacent each side thereof, each of said clamps being adapted to receive at least one leg of one of said leg formations of said leg assembly therein once the leg formations are collapsed to lie flat adjacent each other whereby said leg assembly and said basket assembly will take up a minimum amount of space when collapsed and releasably connected together to facilitate easy carrying of the then formed compact assembly.

2. The laundry buggy of claim I wherein the lower end of each leg of said leg assembly has a wheel assembly mounted thereto.

3. The laundry buggy of claim 1 wherein said bottom wall of said basket assembly has opposed depending end edges and opposed depending side edges so as to form a space or hollow beneath said bottom wall adjacent to said underside thereof into which the folded leg assembly easily can be received.

4. The laundry buggy of claim 1 wherein said flexible side walls are made of a flexible mesh or netting material.

5. The laundry buggy of claim 1 wherein at least one of said end walls of said basket assembly has a window therein and a piece of flexible material is mounted in said window.

6. The laundry buggy of claim 5 wherein said piece of flexible material is a piece of flexible mesh netting material.

7. The laundry buggy of claim 1 including four linkage assemblies, each linkage assembly including two links which are each pivoted at one end to one end of the other link, with the other end of each link being pivotally connected, respectively, either to a side edge of one of said end walls or to a side of said bottom wall thereby to provide support for holding up said end walls and yet permitting said end walls to be folded over said bottom wall.

8. The laundry buggy of claim 1 wherein at least one of said end walls has a handle fixed to the outer end surface thereof.

9. The laundry buggy of claim 1 wherein at least one side of said bottom wall has a handle mounted thereto.

10. The laundry buggy of claim 1 including a clothes hanging assembly comprising a lower tubular member, an upper, smaller in diameter rod member telescopically received in said tubular member, and an arm member fixed to and extending outwardly from the upper end of said rod member, and wherein one end wall of said basket assembly has spaced apart upper and lower U-shaped clamps mounted thereto for receiving therein said tubular member of said clothes hanging assembly.

11. The laundry buggy of claim 9 wherein said lower U-shaped clamp is closed off on the end thereof facing downwardly to form a stop for said tubular member.

12. The laundry buggy of claim 9 wherein said bottom wall of said basket assembly has on the underside of said bottom wall thereof and inwardly of the sides and ends of said bottom wall a U-shaped clamp for snap-fittingly receiving said tubular member of said clothes hanging assembly when it is in a collapsed state, whereby said clothes hanging assembly can be fixed to and carried with said laundry buggy when the components thereof are collapsed and fixed together in compact manner.

13. A laundry buggy which is collapsible to take up a small volume, such as the volume occupied by a large attache case, and which is erectable into a laundry buggy, said laundry buggy comprising a basket assembly including a bottom wall, with a top side and a bottom side, two end walls each pivotably mounted to a respective end of said bottom wall and foldable over said bottom wall, and flexible side walls fixed between said end walls and foldable inwardly over said bottom wall top side upon folding of the end walls over said bottom wall top side and a leg assembly releasably fixed too said bottom side of said bottom wall and including four legs which are foldable parallel to said side wall to a generally flat position assembly, means for releasably fixing said leg assembly in an erect position to said bottom side of said bottom wall of said basket assembly, said leg assembly being detachable from said basket assembly for being collapsed to said generally flat position assembly and means for releasably fixing the collapsed leg assembly to and adjacent said bottom side of said bottom wall.

14. The laundry buggy of claim 13 including four wheels, each wheel being releasably mounted to the lower end of one of said legs.

* * * * *

UNITED STATES PATENT AND TRADEMARK OFFICE
CERTIFICATE OF CORRECTION

PATENT NO. : 4,948,077
DATED : August 14, 1990
INVENTOR(S) : Anthony J. Gonzalez It is certified that error appears in the above-identified patent and that said Letters Patent is hereby corrected as shown below:

On the Title page

Abstract, line 10 "towards" should be --toward--.

Column 1, line 36 "an" should be --and--.

Column 2, line 7 "FIG.1.and" should be --FIG. 1 and--.

Column 2, line 33 "FIG 10" should be --FIG. 10--.

Column 3, line 16 "showm" should be --shown--.

Column 4, line 58 "paid" should be --pair--.

Column 6, line 34 "too" should be --to--.

Signed and Sealed this

Twenty-third Day of March, 1993

Attest:

STEPHEN G. KUNIN

*Attesting Officer*     Acting Commissioner of Patents and Trademarks